United States Patent [19]

Phillips

[11] 4,230,141
[45] Oct. 28, 1980

[54] PULSATOR VALVES

[76] Inventor: Evan M. Phillips, 26 Acacia Crescent, Hamilton, New Zealand

[21] Appl. No.: 896,145

[22] Filed: Apr. 13, 1978

[51] Int. Cl.³ .................... F16K 31/145; F16K 11/02
[52] U.S. Cl. .................................. 137/103; 251/61.1
[58] Field of Search .............. 137/103, 102, 625.66; 251/61.1

[56] References Cited

U.S. PATENT DOCUMENTS

| | | | |
|---|---|---|---|
| 2,652,847 | 9/1953 | Segebarth | 137/103 |
| 2,664,095 | 12/1953 | Magni | 137/103 |
| 3,707,162 | 12/1972 | Bachmann | 137/625.66 X |
| 3,930,515 | 1/1976 | Kennedy et al. | 137/625.66 X |
| 3,974,849 | 8/1976 | Dawson | 251/61 X |

Primary Examiner—William R. Cline
Attorney, Agent, or Firm—Holman & Stern

[57] ABSTRACT

A pulsator valve has a valve body comprising a base and a cap with a diaphragm edge-mounted therebetween. Internally, the base is divided into inner and outer chambers by an annular valve seat with which one surface of the diaphragm cooperates to form an annular valve. The outer chamber has an atmosphere connection and the inner chamber has a valve connection to a source of subatmospheric pressure and a further connection. A valve element for the valve connection is carried by the diaphragm. Pulsating pressure is applied to the opposite surface of the diaphragm to connect the further connection either with the atmosphere connection or with the valve connection. At least one of the valve connections and the annular connection is closed in all positions of the diaphragm to prevent air flow between the atmosphere connection and the valve connection.

8 Claims, 4 Drawing Figures

PULSATOR VALVES

BACKGROUND OF THE INVENTION

This invention relates to pulsator valves and has been devised particularly though not solely as a pulsator valve for a milking machine system.

In most conventional milking machine systems a pulsator valve is provided to connect alternately a vacuum supply or atmospheric pressure to the cavity between the teat cut body and a flexible teat cup liner. When 'vacuum' is connected to this cavity is tends to balance or counteract the effect of vacuum connected to the inside of the liner and the liner will assume its natural normally cylindrical shape. When atmospheric (or other) pressure is connected to this cavity the liner is collapsed squeezing the teat.

Common types of pulsator valves at present in use may incorporate a plate, reed or spool as the valving means which may be actuated by a variety of mechanisms. In most existing pulsator designs a situation may arise where, when the valving means is being driven from one position to another (i.e. from connecting vacuum or atmospheric pressure to the outlet port) both the vacuum and atmospheric ports are connected together and/or to the outlet port. This may give rise to unstable operation and/or a variable or undesired output 'pulse' profile.

Some types of conventional pulsator valves will normally unless made to unreasonably fine engineering tolerances, have all ports connectd together at some time in its operating cycle.

It is therefore an object of the present invention to provide a pulsator valve which will at least provide the public with a useful choice.

SUMMARY OF THE INVENTION

Accordingly the invention consists in a pulsator valve comprising a body defining a plurality of valve ports and a diaphragm edge mounted in said body and operable by pressure differential from one side of said diaphragm to the other to open and close selected ones of said valve ports in a desired manner by deflection of said diaphragm.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF DRAWINGS

One preferred form of the invention will now be described with reference to the accompanying drawings in which.

DESCRIPTION OF PREFERRED EMBODIMENTS

Figure 1:
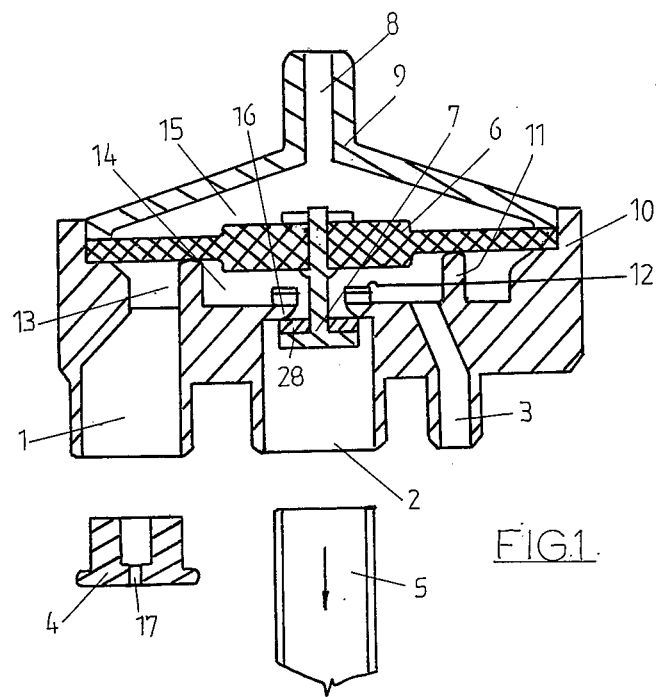
FIG. 1 is a cross-sectional elevation of a pulsator valve according to the invention arranged in a 'reversing' mode.

In the preferred form of the invention a pulsator valve able to be arranged in various alternative configurations is constructed as follows.

The valve is provided with a body which comprises a base portion 10 and a cap portion 9 which are preferably moulded from a suitable plastics material. The valve incorporates a diaphragm 6 made from a synthetic rubber such as neoprene or from a natural rubber or flexible plastics material and which is rim mounted by the diaphragm edge between the body 10 and cap 9. Both the valve body and the diaphragm are substantially circular in plan view. The valve body is provided with various inlet and outlet ports which will be described more fully in the following description of the operation of the valve and also incorporates an internal valve 7 having a valve face 28 which engages with a seat 16 and which is operable by way of a rod by the movement of the diaphragm 6.

The arrangement and use of the valve when arranged as a simple 'reversing' slave pulsator valve is as follows.

Diaphragm 6 which when at rest normally will contact annular valve seat 11 is held down onto valve seat 11 and deflected to stop 12 by vacuum on its underside because port 8 is connected to atmospheric pressure. Port 3 connects the teat cup outer cavity to 'vacuum' supplied through port 2 by means of the opening between valve 7 and valve seat 16. When a vacuum signal from a 'master' or other source is applied to chamber 15 via port 8 this will balance the vacuum applied to the underside of diaphragm 6 over the area bounded by annular seat 11 and the diaphragm 6 will lift off stop 12 closing valve 7 against seat 16. Port 3 is connected to the teat cup and at this point is closed off to both vacuum and atmospheric pressure.

Since the signal vacuum applied through port 8 to chamber 15 is operating over the whole upper surface area of diaphragm 6 it will flex in an annular manner lifting off seat 11 and tending to form a catenary curve between its centre and outer periphery connecting port 3 by chamber 14 to chamber 13 and port 1 allowing air at atmospheric pressure to pass through to port 3. The speed at which this air is allowed to enter is controlled by orifice 17 and plug 4 which is inserted into port 1. This in turn controls the rate of squeeze applied to the teat cup liner. When the signal vacuum is removed from port 8 and atmospheric air allowed to enter the pressure in chamber 15 will rise allowing diaphragm 6 to flex back into contact with seat 11 thus interrupting the connection between chambers 13 and 14, disconnecting the teat cup outer cavity from atmospheric pressure. At this point teat cup port 3 is closed momentarily to both vacuum and atmospheric pressure. The system vacuum operating on the underside of valve 7 will then draw the valve down away from seat 16 and the diaphragm 6 down onto stop 12. The vacuum supply will then again be coupled to the teat cup outer cavity by the space between valves 7 and seat 16 chamber 14 and port 3.

It will be seen that at both times when changing from one position to the other the diaphragm flexes to ensure that both vacuum and atmospheric air pressures are closed off before either one is connected to the teat cup outer cavity. Also the wave form of the 'signal' or the rate of application of the signal to port 8 will not affect the 'sharpness' of the output pulse as this is entirely dependent upon the action of the diaphragm 6 when suitable pressure conditions have been reached between its upper and lower surfaces. In particular the valve in the reversing slave mode as shown in FIG. 1 has a trigger type action which occurs at a specific vacuum level due to the change in pressure distribution across the diaphragm which takes place as the valves open.

Figure 2:
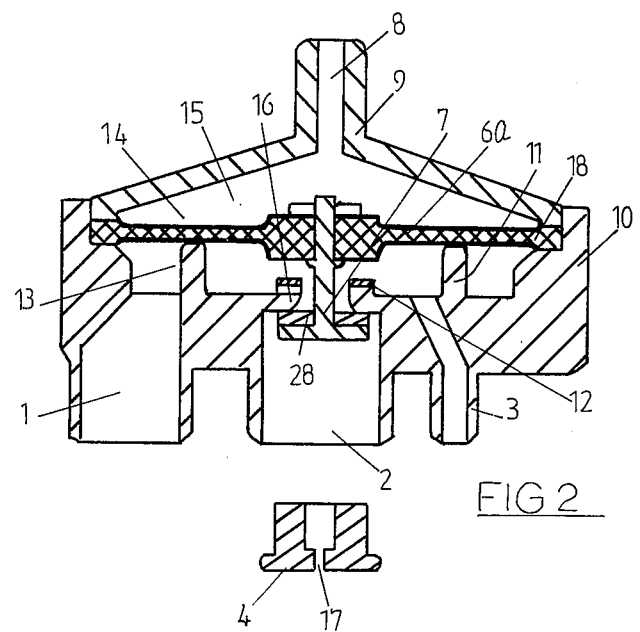
FIG. 2 is a cross-sectional elevation of a pulsator valve according to the invention when arranged as a 'non-reversing' pulsator.

The valve can also be arranged to operate as a simple 'non-reversing' pulsator as shown in FIG. 2.

In this mode a vacuum signal to port 8 will give a vacuum output from port 3 to the teat cup outer cavity. In this mode a modified diaphragm 6a is used having an annular depression 18 on each face between the central boss and the outer rim of the diaphragm which has the same respective thicknesses in its boss and rim as the 'reversing' diaphragm 6 in FIG. 1. This recess 18 gives a clearance of approximately 0.5 mm between diaphragm 6a and annular seat 11.

When the vacuum supply is connected to port 1 and with no vacuum signal to port 8 atmospheric pressure in chamber 15 will force diaphragm 6a down into contact with seat 11 thus bowing down the centre of 6a and lowering valve 7 in relation to seat 16. Atmospheric pressure is now coupled through port 2 via the open port valve 7 and chamber 14 to the teat cup outer cavity.

When a vacuum signal from a master pulsator or some other source is applied to port 8 pressure is lowered in chamber 15. Atmospheric pressure in chamber 14 will then force up the centre of diaphragm 6a until valve 7 contacts seat 16 at this point in time port 3 is closed off to both vacuum and atmospheric pressures. The diaphragm will then tend to flex upwards in a catenary manner between the central boss of diaphragm 6a and the point where 6a contacts annular seat 11. As the pressure differential between chambers 14 and 15 increases the diaphragm 6a will peel away from the annular valve seat 11 to form a catenary curve between the central boss and its outer rim. The teat cup outer cavity will then be connected via port 3, cavity 14 and cavity 13 to the vacuum supply which is connected to port 1 in this mode.

It will be appreciated that the connecting of chambers 13 and 14 will be achieved very rapidly as the flexible diaphragm 'snaps' away from the seat 11 providing the pressure change in chamber 15 is rapid.

Figure 3:
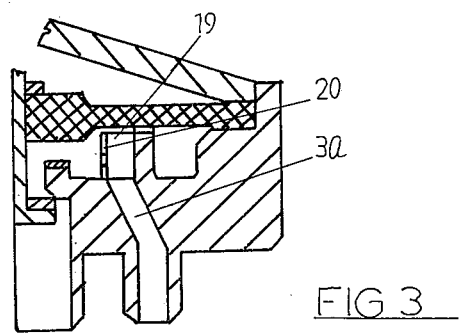
FIG. 3 is a scrap view of a portion of the pulsator valve shown in FIG. 2 incorporating an additional orifice plug to provide a desired operating mode.

When pulsators are to be used in 'ripple' mode i.e. when the output from one pulsator is used to supply the signal for the next unit a suitable port 3a (FIG. 3) may be provided connecting to chamber 14. It may be advantageous to be able to restrict the passage of air through ports 3 or 3a to control the rate of squeeze to a teat cup liner or to delay the rate at which a signal pulse is applied to other pulsators in a ripple or cascade system. This may be achieved by fitting a plug 4 with a restricting orifice to port 1 or 2 and/or to fit a plug 19 (FIG. 3) with orifice 20 to ports 3 or 3a. The orifice 20 is sized to provide the required restriction. The upper edge of plug 19 will seal against the lower surface of the diaphragm 6a in a similar manner to seat 11 so that when diaphragm 6a is lifted off seat 11 little restriction is offered to air flow inwards through ports 3 or 3a.

Figure 4:
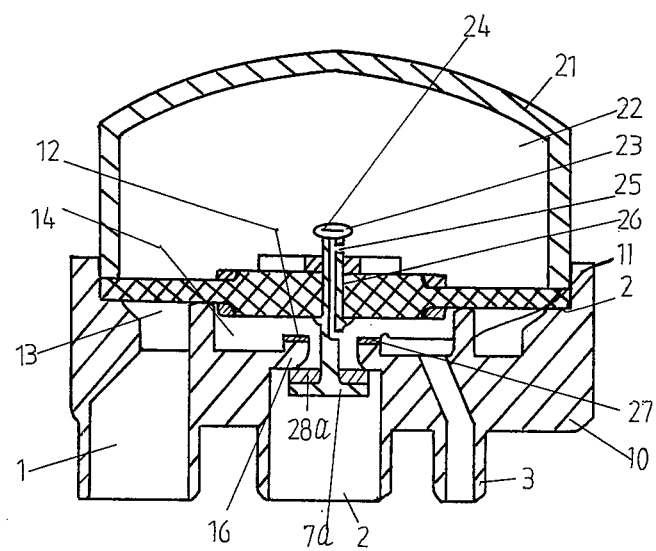
FIG. 4 is a cross-sectional elevation of an alternative form of pulsator valve according to the invention arranged in a 'self-energising' mode.

The pulsator may also be modified to operate in a 'self-energising' mode as shown in FIG. 4. In this configuration the cap 9 of the configurations previously described is replaced with a dome 21. The central valve is replaced by a valve 7a having an axial conduit 26 connecting the upper end of the valve spindle with apertures 27. This configuration will give a pulse ratio of approximately 50-50 vacuum to air but this pulse ratio may be modified by the addition of orifice 25 and flap valve 24 retained by cage 23 over the top of conduit 26.

When valve 24 is lifted by air passing up conduit 26 air may escape through the valve opening so formed as well as through orifice 25. When air is exhausted from chamber 22, valve 24 closes and air may only exhaust through orifice 25. By adjusting the size of orifice 25 and the opening of valve 24 the vacuum to air pulse ratio may be decided.

With the vacuum system conneced to port 2 air is evacuated from cavity 14 and residual air pressure in dome cavity 22 will deflect the centre of diaphragm 6 downwards until it reaches stop 12, fully opening valve 7a from seat 16 and connecting the vacuum system through cavity 14 to port 3. Chambers 22 is connected to cavity 14 by conduit 26 and as the pressure in 22 is lowered to approach the pressure in 14 the diaphragm returns to its original rest position closing valve 7a onto seat 16. Atmospheric pressure acting on the underside of the diaphragm over annular chamber 13 will lift diaphragm 6 away from seat 11. The diaphragm 6 will bow upwards in a catenary manner between its central boss and outer rim.

With the closing of valve 7 and the lifting of the diaphragm 6 from seat 11 air under atmospheric pressure is then able to flow to port 3 and through port 1, cavities 13 and 14 and the conduit 26 into dome cavity 22.

As the pressure in cavity 22 rises diaphragm 6 will return to its rest position closing off the aperture between diaphragm 6 and seat 11. Low pressure from the vacuum supply in port 2 will then allow the atmospheric (or near atmospheric) pressure in cavity 22 to force diaphragm 6 downwards against the stop 12 opening valve 7a and connecting the vacuum system via port 1 and chambers 14 and 13 to port 3. The cycle will then automatically be repeated.

If the device is to be operated as a master pulsator, port 3 may be connected directly to a test cup assembly and/or to the signal port 8 of slave pulsators shown in FIGS. 1 and 2.

A pulsator valve as described above has the advantages that it is simple and cheap to manufacture and has a minimum of moving parts which will provide long service without attendent wear problems. Furthermore the action of the valve gives a sharp wave form configuration in a simple manner giving a desired result for a milking machine. The flexibility of the diaphragm is utilised in such a way that the opening and closing of the diaphragm and valve 7 or 7a is not synchronous. Each valve closes before the other valve opens ensuring that movement of air from the air supply orifice directly to the vacuum source is prevented.

The valve also has the advantage that by rearranging the connections to various ports and by interchanging simple components in the valve the valve is capable of being operated as a 'master', slave-non-reversing, slave-reversing, or slave-ripple or in any other of the known pulsator systems or sequences and as a releaser, booster, milk lifter or actuator pulsator.

I claim:

1. A milking machine pulsator valve comprising a valve body, a diaphragm mounted in said body for flexing movements when exposed on one surface thereof to pressure fluctuations, means for exposing said one surface of said diaphragm in use to a pressure alternating between atmospheric pressure and a lower pressure in pulse alternations, an annular valve seat separating said body into an outer chamber and an inner chamber, part of said diaphragm coacting with said annular valve seat to form an annular valve between said chambers, said outer chamber having an outer connection thereto and said inner chamber having a valve connection and a further connection thereto, said valve connection having an inner valve comprising an inner valve seat on an outer face of said valve connection and a cooperating valve member connected by a valve stem to said diaphragm to contact said inner valve seat and close said valve connection when said lower pressure is initially applied to said one surface, said annular valve seat and said diaphragm being relatively positioned so that on application of said lower pressure to said one surface said diaphragm flexes off said annular valve after said co-operating valve member contacts said inner valve seat to close said inner valve and on application of atmospheric pressure to said one surface and application of a lower pressure to said inner chamber said diaphragm flexes to first close onto said annular valve seat while said inner valve is still closed sealing said further connection from both said outer connection and said valve connection and to then open said inner valve so that at least one of said annular valve and said inner valve being closed in all positions of said diaphragm to prevent direct flow of air between said outer connection and said valved connection.

2. The pulsator valve of claim 1 wherein said valve body comprises a base and a cap and said diaphragm is edge mounted between said cap and said base.

3. The pulsator valve of claim 2 wherein said means for exposing said one surface of said diaphragm to alternating pressure comprises an opening in said cap.

4. The pulsator valve of claim 2 wherein said means for exposing said one surface of said diaphragm to alternating pressure includes conduit means extending through said diaphragm.

5. The pulsator valve of claim 1 wherein said cooperative valve member is carried by said diaphragm.

6. The pulsator valve of claim 1 wherein said outer connection includes a plug having a control orifice therein for controlling air flow through said outer connection.

7. The pulsator valve of claim 1 wherein said diaphragm includes a central boss portion, an outer rim portion and a reduced thickness annular portion between said boss portion and said outer rim portion.

8. The pulsator valve of claim 1 including means for restricting air flow through said further connection.

* * * * *